(12) United States Patent
Ali (10) Patent No.: US 6,424,270 B1
(45) Date of Patent: Jul. 23, 2002

(54) UTILITY METER INTERFACE UNIT

(75) Inventor: Mohammed S. Ali, Montgomery, AL (US)

(73) Assignee: Schlumberger Resource Management Services, Inc., Norcross, GA (US)

(*) Notice: Subject to any disclaimer, the term of this patent is extended or adjusted under 35 U.S.C. 154(b) by 0 days.

(21) Appl. No.: 09/183,645

(22) Filed: Oct. 30, 1998

(51) Int. Cl.[7] ............................................. G08B 23/00
(52) U.S. Cl. ........................... 340/870.02; 340/870.03; 340/870.11
(58) Field of Search ................ 340/870.02, 870.03, 340/870.11, 580, 601, 825.31; 73/170.26

(56) References Cited

U.S. PATENT DOCUMENTS

| | | | | |
|---|---|---|---|---|
| 3,676,875 A | * | 7/1972 | Adams | 340/870.02 |
| 3,697,970 A | * | 10/1972 | Jaxheimer | 340/870.02 |
| 4,439,764 A | * | 3/1984 | York | 340/870.02 |
| 4,642,634 A | * | 2/1987 | Gerri | 340/870.02 |
| 4,642,635 A | * | 2/1987 | Snaper | 340/870.03 |
| 4,804,957 A | * | 2/1989 | Selph | 346/870.03 |
| 4,839,642 A | | 6/1989 | Batz et al. | |
| 5,252,967 A | * | 10/1993 | Brennan | 340/870.02 |
| 5,448,230 A | * | 9/1995 | Scanker | 340/870.03 |
| 5,451,938 A | * | 9/1995 | Brennan | 340/870.12 |
| 5,544,089 A | | 8/1996 | Hemminger | |
| 5,548,527 A | | 8/1996 | Hemminger | |
| 5,553,094 A | | 9/1996 | Johnson et al. | |
| 5,555,508 A | | 9/1996 | Hemminger | |
| 5,594,431 A | * | 1/1997 | Sheppard | 340/870.02 |
| 5,602,744 A | * | 2/1997 | Meek | 340/870.02 |
| 5,625,353 A | * | 4/1997 | Katagiri | 340/870.03 |
| 5,631,843 A | | 5/1997 | Munday | |
| 5,682,422 A | * | 10/1997 | Oliver | 340/870.02 |
| 5,726,646 A | * | 3/1998 | Bane | 340/870.03 |
| 5,796,250 A | * | 8/1998 | Dames | 340/870.02 |
| 5,815,089 A | * | 9/1998 | Katagiri | 340/870.03 |
| 5,835,025 A | * | 11/1998 | Zufelt | 340/870.02 |
| 6,006,212 A | * | 12/1999 | Schleich | 705/412 |
| 6,088,659 A | | 7/2000 | Kelley | |
| 6,094,622 A | | 7/2000 | Hubbard | |
| 6,177,883 B1 | | 1/2001 | Jennetti | |
| 6,232,885 B1 | | 5/2001 | Ridenour et al. | |
| 6,232,886 B1 | | 5/2001 | Morand | |

OTHER PUBLICATIONS

Makison, David, Philpot, Ludlow, "Modular Meter Configuration and Methodology," U.S. Patent application Ser. No. 09/450,890 filed Nov. 29, 1999.

Hamilton, David, "Self–Powered Fluid Meter," U.S. Patent application Ser. No. 09/754,025, filed Jan. 3, 2001.

\* cited by examiner

*Primary Examiner*—Michael Horabik
*Assistant Examiner*—Albert K. Wong
(74) *Attorney, Agent, or Firm*—Dority & Manning (57) ABSTRACT

A meter interface unit (MIU) for use in sending, via RF or other suitable type of transmission, utility consumption information from a utility meter to a remote location. The MIU includes an antenna electrically coupled to a transmitter device. A microprocessor is operative to initiate reading of usage information from the meter encoder associated with the meter and control transmission of that information at selected times. The microprocessor implements functions to determine which of several known types of meter encoders is present. The meter encoder data is then read and converted to the desired transmission protocol. Power management circuitry is provided to limit application of power to the encoder, except when usage information is being obtained. The power management circuitry may also include step-up circuitry to convert a lower voltage level supplied by a power source to a higher voltage level needed by the encoder.

34 Claims, 5 Drawing Sheets

UTILITY METER INTERFACE UNIT

BACKGROUND OF THE INVENTION

The present invention relates to automatic and remote meter reading systems of the type used in the utility industry. In particular, the invention relates to radio frequency ("RF") systems used to communicate with metering devices so that utility consumption can be determined from a remote location.

As is well known, utility industries (such as gas, electricity and water) typically install a meter to indicate consumption by a particular customer. The consumption indicated by the meter forms the basis of the bill sent to the customer each month (or over another predetermined period of time). To read consumption from the meter, the utility industries have often utilized personnel whose job has been to physically inspect meters at each customer location.

In order to reduce the need for meter-reading personnel to inspect every meter, many utilities have begun using various automatic meter reading ("AMR") and remote meter reading ("RMR") systems. These systems simplify the meter-reading process, by reading usage information from the individual meters through RF transmission. Toward this end, each of the meters will include a meter interface unit ("MIU") that controls transmission of usage information read from the meter. At a predetermined scheduled time or upon receipt of an electronic request, the MIU will send the usage information via a predetermined RF format. Examples of MIU devices of the prior art are shown, for example, in U.S. Pat. Nos. 5,553,094 and 4,839,642. Each of these patents is incorporated herein by reference.

In the past, it has often been necessary to provide a dedicated MIU device for the particular meter encoder with which it will be utilized. For example, water meters may be equipped with one of a number of different types of meter encoders. In addition, a particular usage location may contain several meter encoders networked together to provide compound, or multiple, registers. Thus, it was often necessary to determine which of any number of MIU devices was required in a particular application.

In addition, certain older meter encoders have been considered to be generally incompatible with newer electronics technology. For example, older meter encoders often require voltage levels of 5 volts or greater in order to read usage information. In contrast, modern integrated circuits operate effectively at lower voltage levels, typically 3.6 volts or less. In addition, to limit the need for battery replacement, it is desirable to conserve battery power whenever possible.

SUMMARY OF THE INVENTION

The present invention recognizes various disadvantages of prior art constructions and methods. Accordingly, it is an object of the present invention to provide novel arrangements for the construction of a utility meter interface unit.

It is a further object of the present invention to provide a meter interface unit that can be used with a variety of meter encoder types.

It is a further object of the present invention to provide a meter interface unit operating at a lower voltage level than the meter encoder, while employing a lower voltage power source.

It is a further object of the present invention to provide a meter interface unit which effectively conserves power during times when usage information is not being determined.

It is a further object of the present invention to provide a meter interface unit which can supply a selected clock signal depending on the type of encoder.

Some of these objects are achieved by a utility meter interface unit for use with a meter encoder. The unit comprises a transmitter operative to send usage information obtained from the meter encoder to a remote location. A processor is operative to initiate reading of usage information from the meter encoder and to control transmission thereof. Power management circuitry responsive to the processor is also provided. The power management circuitry is operative to direct power from a power source to the meter encoder only at selected times such that power is conserved during periods when the usage information is not being read.

In some exemplary embodiments, voltage from the power source is modulated by the power management circuitry and supplied to the meter encoder at a predetermined frequency. Preferably, the processor may be operative to identify the meter encoder and responsively adjust the predetermined frequency based thereon. For example, the processor may be operative to read the usage information from both single and compound register encoders.

In addition, the device may read usage information from networks of multiple meter encoders. In such applications, multiple encoders may read using a multiplicity of data lines while employing a common clock signal.

Often, the power management circuitry will include step-up circuitry operative to step-up a source voltage supplied by the power source to a predetermined higher voltage level. In some exemplary embodiments, the step-up circuitry may include a storage capacitor for maintaining the predetermined higher voltage level. A selectively conducting arrangement, such as at least one transistor, may be connected in circuit with the storage capacitor. In such embodiments, the selectively conducting arrangement is controlled to switch at the predetermined frequency. Often, it will be desirable for the step-up circuitry to include an inductor connected in circuit with a diode to supply charging current to the storage capacitor.

Other objects of the present invention are achieved by a utility meter interface unit for use with a meter encoder which comprises a transmitter operative to send usage information obtained from the meter encoder to a remote location. A processor is operative to initiate reading of the usage information from the meter encoder and store data representative thereof in a memory. The processor is further operative during reading of the usage information to identify the meter encoder from among at least two known encoder types. The processor is also operative to control transmission of the usage information utilizing a predetermined transmission protocol.

In some exemplary embodiments, the processor is operative to effect a different clock frequency to be supplied to the meter encoder depending on which type of known encoder is identified. For example, a first of the known encoder types may be a single register encoder and a second of the known encoder types may be a compound register encoder. Depending on the type, the predetermined frequency may be either approximately 1200 hertz or approximately 19.2 kilohertz in some exemplary embodiments.

Often, the meter interface unit may comprise a battery and power management circuitry responsive to the processor. In such embodiments, the power management circuitry is operative to direct power from the battery to the meter encoder only at selected times such that battery power is conserved during periods when the usage information is not being read. Often, the power management circuitry will be operative to modulate voltage from the battery and supply the modulated voltage to the meter encoder at the predetermined frequency. In addition, the power management circuitry may include step-up circuitry operative to step-up a battery voltage supplied by the battery to a predetermined higher voltage level.

Still further objects of the present invention are achieved by a meter interface unit for use with a meter encoder requiring a predetermined encoder voltage level. The unit comprises a power source supplying a source voltage level less than the encoder voltage level. A transmitter is operative to send usage information obtained from the meter encoder to a remote location. A processor is also provided, operative to initiate reading of the usage information from the meter encoder and to control transmission thereof. Power management circuitry responsive to the processor is also provided. The power management circuitry includes step-up circuitry operative to step-up the voltage level supplied by the power source to at least the encoder voltage level.

Additional objects of the present invention are achieved by a method of reading usage information from a utility meter encoder. One step of the method involves supplying power to the encoder at a first predetermined frequency. Based on information responsively supplied by the encoder, it is verified whether the encoder is of a first known type. If the encoder is not of the first known type, power is supplied to the encoder at a second predetermined frequency. Based on information responsively supplied by the encoder, it is then verified whether the encoder is of a second known type. Usage information from the encoder is read and appropriately stored. The usage information is then transmitted to a remote location for further use as necessary.

Often, the first known type of encoder may be a single register encoder, and the second known type of encoder may be a multiple register encoder. When the encoder is of the second known type, usage information from each of the multiple registers may be successively read and stored. According to exemplary methodology, the first predetermined frequency may be approximately 1200 hertz and the second predetermined frequency may be approximately 19.2 kilohertz. Often, it will be desirable to convert usage information received from the meter encoder in a first format to a second format prior to transmission thereof.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Repeat use of reference characters in the present specification and drawings is intended to represent same or analogous features or elements of the invention.

DETAILED DESCRIPTION OF PREFERRED EMBODIMENTS

It is to be understood by one of skill in the art that the present discussion is a description of exemplary embodiments only, and is not intended as limiting the broader aspects of the present invention, which broader aspects are embodied in the exemplary constructions.

Figure 1:
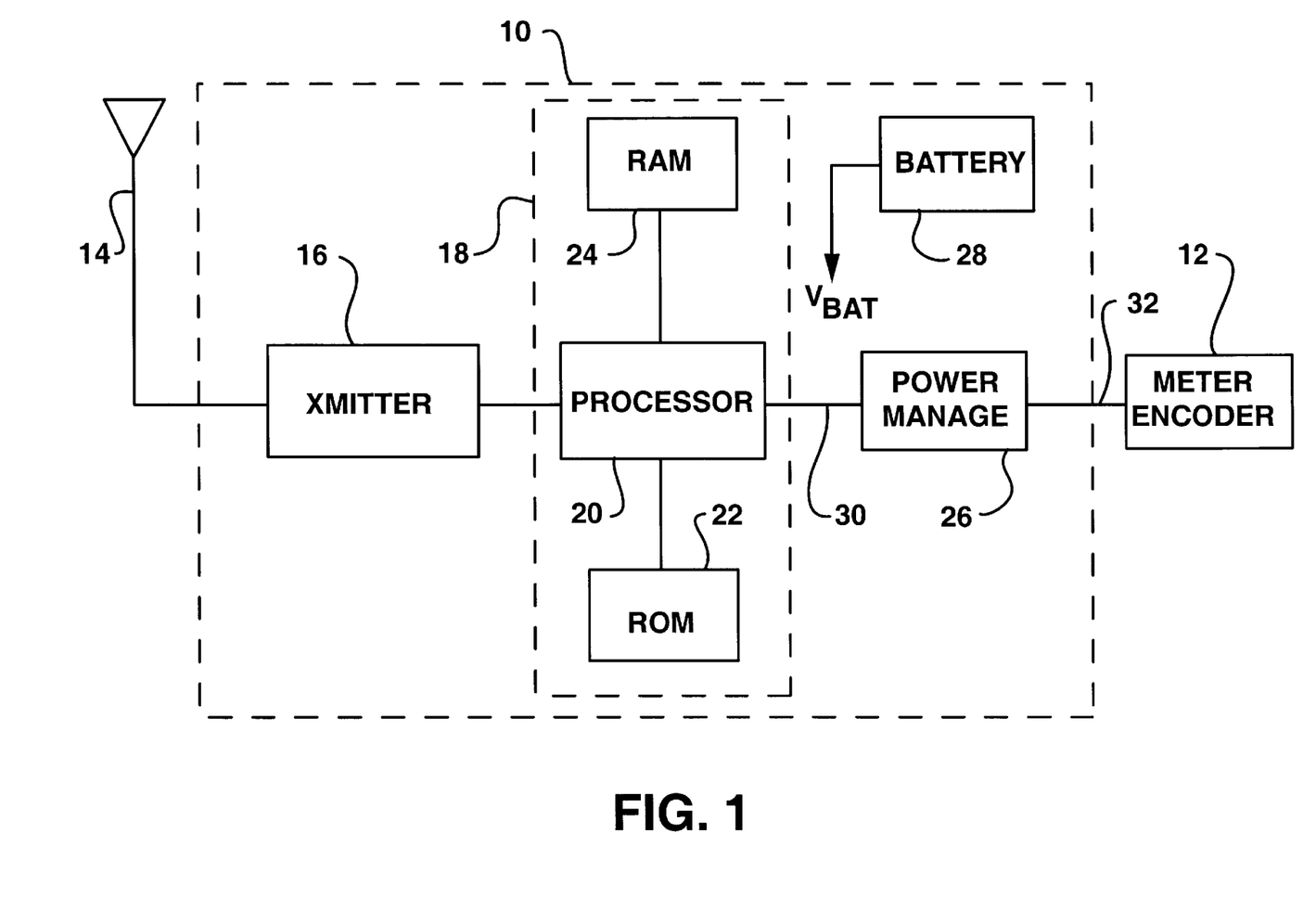
FIG. 1 is a diagrammatic representation of a meter interface unit ("MIU") constructed in accordance with the present invention.

FIG. 1 illustrates a meter interface unit (MIU) 10 of the present invention utilized in conjunction with a meter encoder 12. Typically, meter encoder 12 will function to read usage information from a metering apparatus, such as a mechanical flowmeter. As an example, a water flowmeter will generally have mechanical wheels on which water consumption is displayed. Meter encoder 12 functions to convert the mechanical display into electronic information which is then stored in a local register.

Depending on the type, meter encoder 12 may have one register or multiple registers for temporarily storing usage information. For example, a water meter having a single flowmeter apparatus may be equipped with a single register. Certain meters, such as those including devices for measuring both high and low levels of flow, may be equipped with multiple storage registers. In the past, it has generally been necessary to provide a unique MIU depending on the specific type of meter encoder being used in a particular situation.

As will be described more fully below, MIU 10 is capable of recognizing which type of meter encoder with which it is being used, and to vary its operating characteristics accordingly. As such, MIU 10 overcomes the need frequently seen in the prior art to provide a unique MIU for each meter encoder.

Like the prior art, MIU 10 functions to transmit usage information obtained from meter encoder 12 to a remote location for further processing. Because the illustrated embodiment utilizes RF transmission, MIU 10 is equipped with an antenna 14 and a suitable transmitter 16. Other embodiments, however, may utilize telephone or transmission of another type to send the usage information. Typically, MIU 10 may initiate reading of usage information from meter encoder 12 on a scheduled basis. Preferably, the scheduled time at which reading occurs may be programmable.

As can be seen, MIU 10 includes a microcontroller 18 which is operative to control transmission of usage information obtained from meter encoder 12. Microcontroller 18 includes a processor 20 that implements firmware instructions stored in a suitable non-volatile memory, such as read-only memory (ROM) 22. A random access memory (RAM) 24 may also be provided to permit temporary storage of usage information and the like. MIU 10 further includes power management circuitry 26 functionally interposing microcontroller 18 and meter encoder 12 as shown.

Often, MIU 10 will be located remote from a source of constant electricity. In this case, MIU 10 is equipped with a battery functional to supply a predetermined battery voltage level, $V_{BAT}$. Preferably, the integrated circuits and other components of MIU 10 are fabricated according to newer technology to effectively operate at relatively low voltage levels. For example, modern integrated circuits can often operate effectively at voltage levels of less than 3.6 volts. A battery comprising three cells of 1.2 volts each may thus be used for this purpose.

Unlike the components of MIU 10, many meter encoders are designed to operate at higher voltage levels. For example, it is not unusual for meter encoders to require voltage levels of 5 volts or more in order to accurately read and store usage information. Thus, power management circuitry 26 is configured to step-up the voltage level $V_{BAT}$ to the higher voltage level needed by encoder 12. In addition, power management circuitry 26 is operative to supply power to meter encoder 12 only at selected times when usage information needs to be obtained. As such, battery life is greatly extended over what would be the case if power were supplied to meter encoder 12 at all times. In addition, power management circuitry 26 functions to provide power to meter encoder 12 at a predetermined frequency which may be varied under the control of microprocessor 20 depending on the type of meter encoder.

Figure 2:
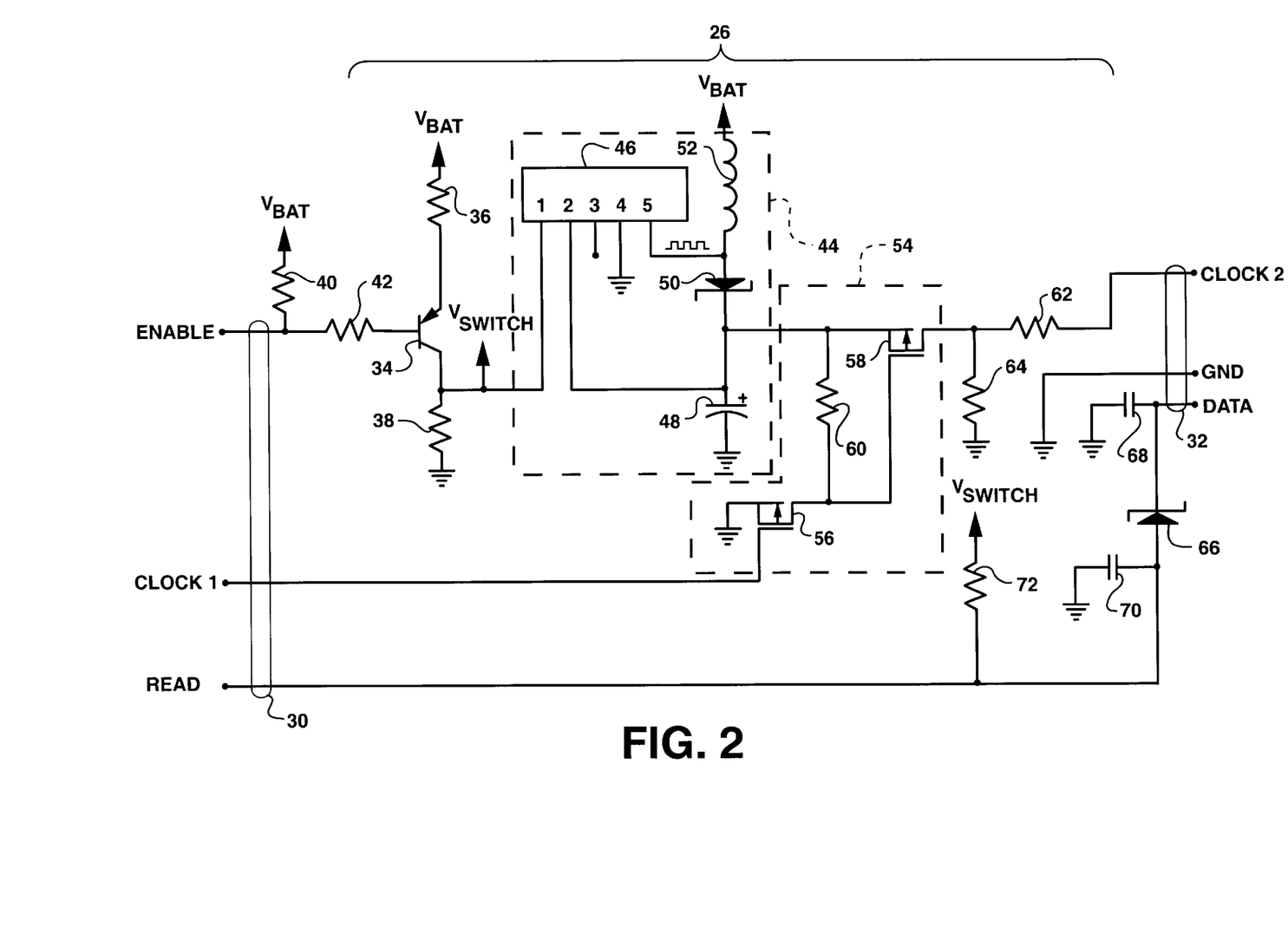
FIG. 2 is a schematic diagram of power management circuitry in accordance with a preferred embodiment of the present invention.

FIG. 2 illustrates a schematic of power management circuitry 26 in one preferred implementation. As can be seen, circuitry 26 is connected to processor 20 through three lines collectively indicated at 30. The three lines are respectively labeled "ENABLE," "CLOCK1" and "READ." Likewise, power management circuitry 26 is connected to meter encoder 12 through three lines collectively indicated at 32. As can be seen, these three lines are respectively labeled "CLOCK2," "GND" and "DATA."

The ENABLE input from processor 20 instructs power management circuitry 26 to allow power to be supplied to meter encoder 12. In this case, the ENABLE signal is a "low" signal which causes transistor 34 to conduct. As a result, a voltage $V_{SWITCH}$ will be produced at the collector of transistor 34. It will be appreciated that the voltage $V_{SWITCH}$ is the voltage $V_{BAT}$ reduced by the voltage drop across transistor 34. (The resistance value of resistor 36 will be small in relation to that of resistor 38.) When the ENABLE input is high, transistor 34 will be maintained in a non-conducting state by the voltage supplied to its base through resistors 40 and 42.

Figures 3A, 3B:
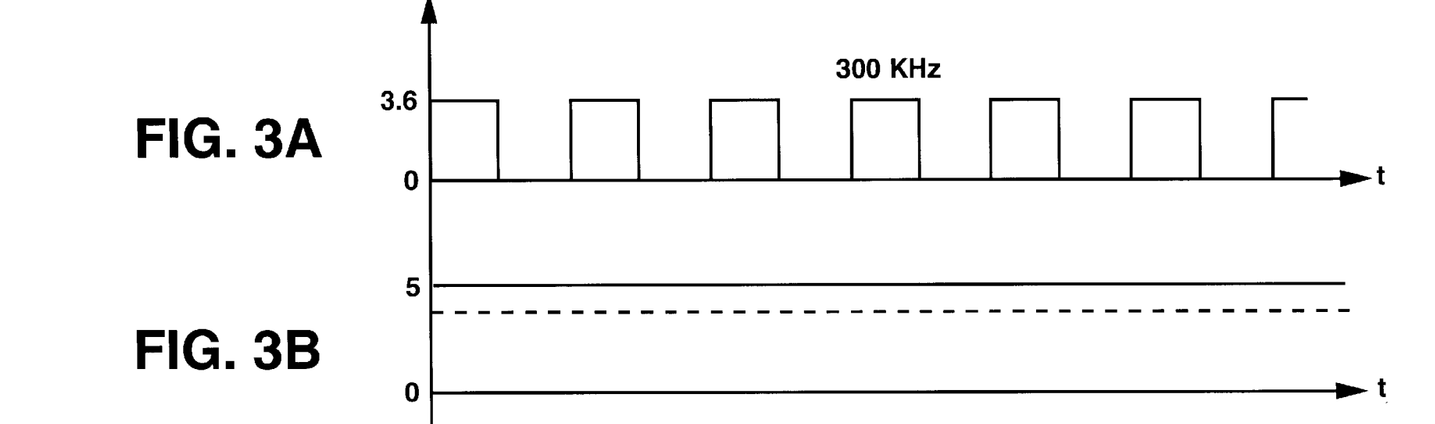
FIGS. 3A, 3B and 3C are respective waveforms showing operation of the step-up and modulated switching circuitry included within the power management circuitry of FIG. 2.

The voltage $V_{SWITCH}$ activates step-up circuitry 44 which supplies the higher voltage level necessary to operate meter encoder 12. Toward this end, step-up circuitry 44 includes an integrated circuit (IC) 46 which receives the voltage $V_{SWITCH}$ as a power input at its pin 1. When power is received, IC 46 operates to supply a DC output from pin 2. A high frequency output (shown in FIG. 3A) having a peak voltage level $V_{SWITCH}$ is supplied from pin 5. Preferably, the frequency of the pin 5 output will be many times the clock frequency used to read usage information from the meter encoder. For example, the output of pin 5 may have a frequency of approximately 300 kilohertz or greater. A suitable integrated circuit for use as IC 46 is available under Part No. ISC8321 from Vishay.

It can be seen that the DC output from pin 2 of IC 46 is applied to one terminal of a capacitor 48. As a result, capacitor 48 will be charged up to at least this voltage level. In addition, the output of pin 5 is applied to a terminal interconnecting a diode 50 and an inductor 52. Inductor 52 is, in turn, connected to voltage $V_{BAT}$. In presently preferred embodiments, a pulse width modulated (PWM) signal is supplied as an output from pin 5 of IC 46. It should be appreciated, however, that other suitable output signals, such as frequency modulated or pulse frequency modulated signals, may also be supplied.

As a result of the pulse applied from pin 5 of IC 46, a charging current will be produced in inductor 52. When the pulse is off, this current flows through diode 50, increasing the charge across capacitor 48. The resulting voltage of 5 volts or more that appears on capacitor 48 (shown in FIG. 3B) is produced from charging current passing through diode 50. Diode 50 will prevent backfeed of current through inductor 52.

Meter encoders are typically configured to receive operational power as a pulse width input having a predetermined frequency and duty cycle. For example, many meter encoders are configured to operate at a frequency of 1200 hertz and 50% duty cycle. Other meter encoders, such as those having multiple registers, are often designed to operate at higher frequencies. For example, some encoders having compound registers are designed to operate from a 19.2 kilohertz input signal of 50% duty cycle. In addition to supplying power to the meter encoder, the square wave input provides a clock signal against which output of the encoder's register is synchronized.

As will be described more fully below, processor 20 is operative to identify meter encoder 12 from among several known types. Depending on the type of meter encoder that is identified, the clock frequency that is output by microprocessor 20 may be varied accordingly. This clock signal is received by power management circuitry 26 along the CLOCK1 input. The clock signal is then applied to switching circuitry 54 which modulates the voltage across capacitor 48.

Figure 3C:
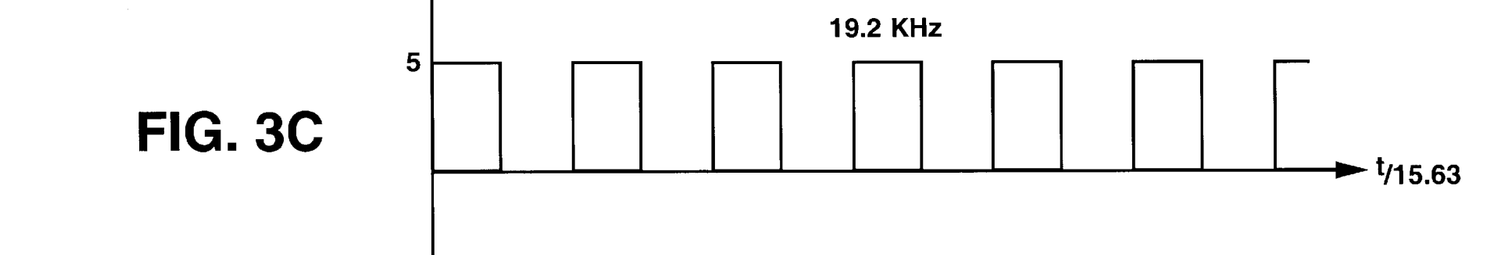

FIG. 3C illustrates the modulated output of switching circuitry 54. In this case, switching circuitry 54 is "chopping" the DC voltage on capacitor 48 at a frequency of 19.2 kHz. Because 19.2 kHz is about 15.63 times lower in frequency than the 300 kHz output from pin 5 of IC 46, the time scale in FIG. 3C has been compressed by a like amount. Otherwise, each pulse in FIG. 3C would extend beyond the period shown in FIGS. 3A and 3B.

Switching circuitry 54 includes a pair of field effect transistors (FETs) 56 and 58 arranged in series as shown. A biasing resistor 60 is connected across FETs 56 and 58 to limit current flowing through FET 58. Through the operation of switching circuitry 54, power is applied to the clock output of power management circuitry 26 at the desired voltage and frequency for reading usage information from meter encoder 12. As shown, a resistor 62 is provided to limit current flowing into meter encoder 12. A resistor 64 is provided to "pull down" the CLOCK2 input of meter encoder 12 when power is not being applied.

Usage information is read from meter encoder 12 at its DATA output. The information is detected by processor 20 along the READ line of power management circuitry 26. A pair of grounded capacitors 68 and 70 are connected on respective sides of diode 66 to filter noise that may be present in the data signal. This is particularly advantageous in view of the relatively long distance that may separate MIU 10 and meter encoder 12. Often, even if a higher frequency signal (e.g., 19.2 kHz) is used to power the meter encoder, the data will still be read out at a lower frequency (e.g., 1200 Hz).

Voltage level $V_{SWITCH}$ is applied to the READ line through a resistor 72 for reducing the voltage of the data fed from meter encoder 12 to the lower voltage level at which components of MIU 10 operate. A common ground, as indicated by the GND line extending between power management circuitry 26 and meter encoder 12, provides a common ground level for reference purposes.

Figure 4:
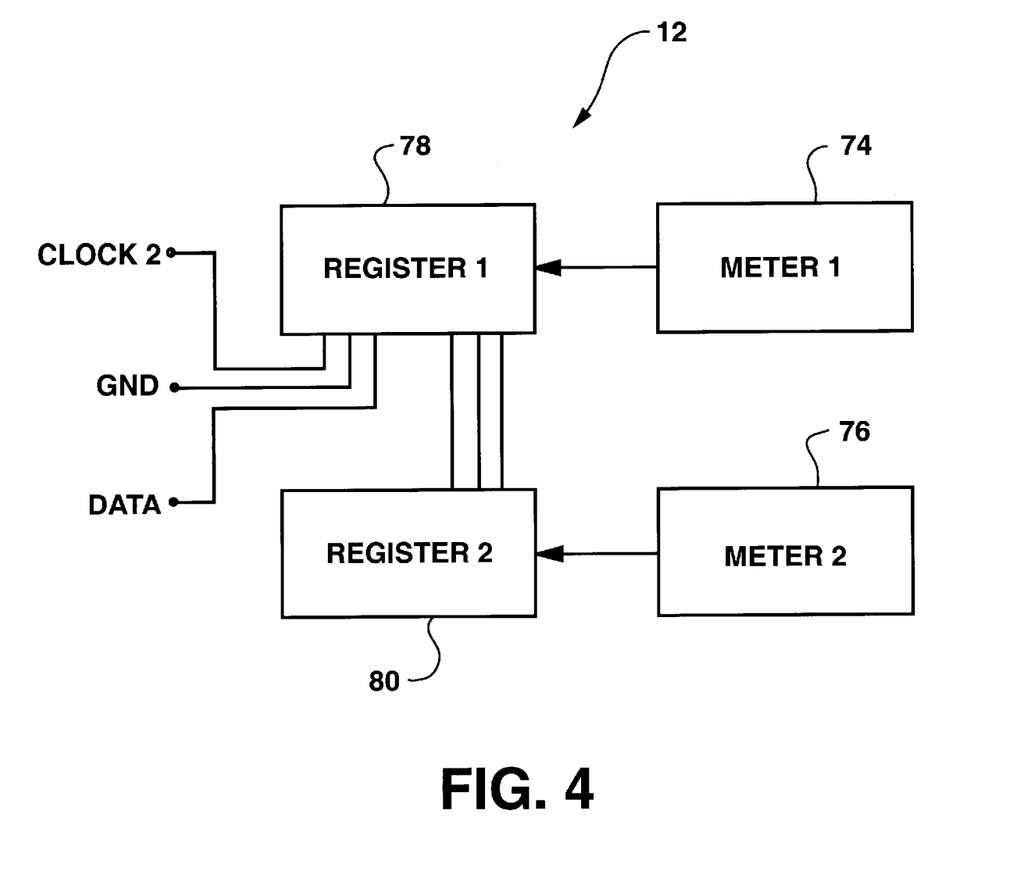
FIG. 4 is a diagrammatic representation of an encoder system having compound registers, with which the MIU of FIG. 1 may be utilized.

Referring to FIG. 4, certain additional aspects of meter encoder 12 will be explained. In this case, meter encoder 12 includes a pair of reader circuits 74 and 76 associated with a respective mechanical consumption meter. For example, the meter associated with circuit 74 may indicate consumption of water at low levels of flow. The meter associated with circuit 76 may be configured to indicate consumption of water at higher flow levels. Each of the meters will typically include mechanical wheels which are read, and converted to electronic data. The electronic data, in turn, is stored in respective registers 78 and 80.

As shown, the CLOCK2, GND and DATA lines extend to register 78, which has three like lines extending to register 80. Power is fed to meter encoder 12 by the CLOCK2 output of power management circuitry 26. The frequency of the clock signal is utilized as a basis for synchronizing the output of electronic information along the DATA line. The power signal passes is also used to charge a capacitor inside of register 78. The frequency and duty cycle of the clock signal is chosen so that the capacitor will stay charged sufficiently to allow data to be read from the encoder.

Figure 5:
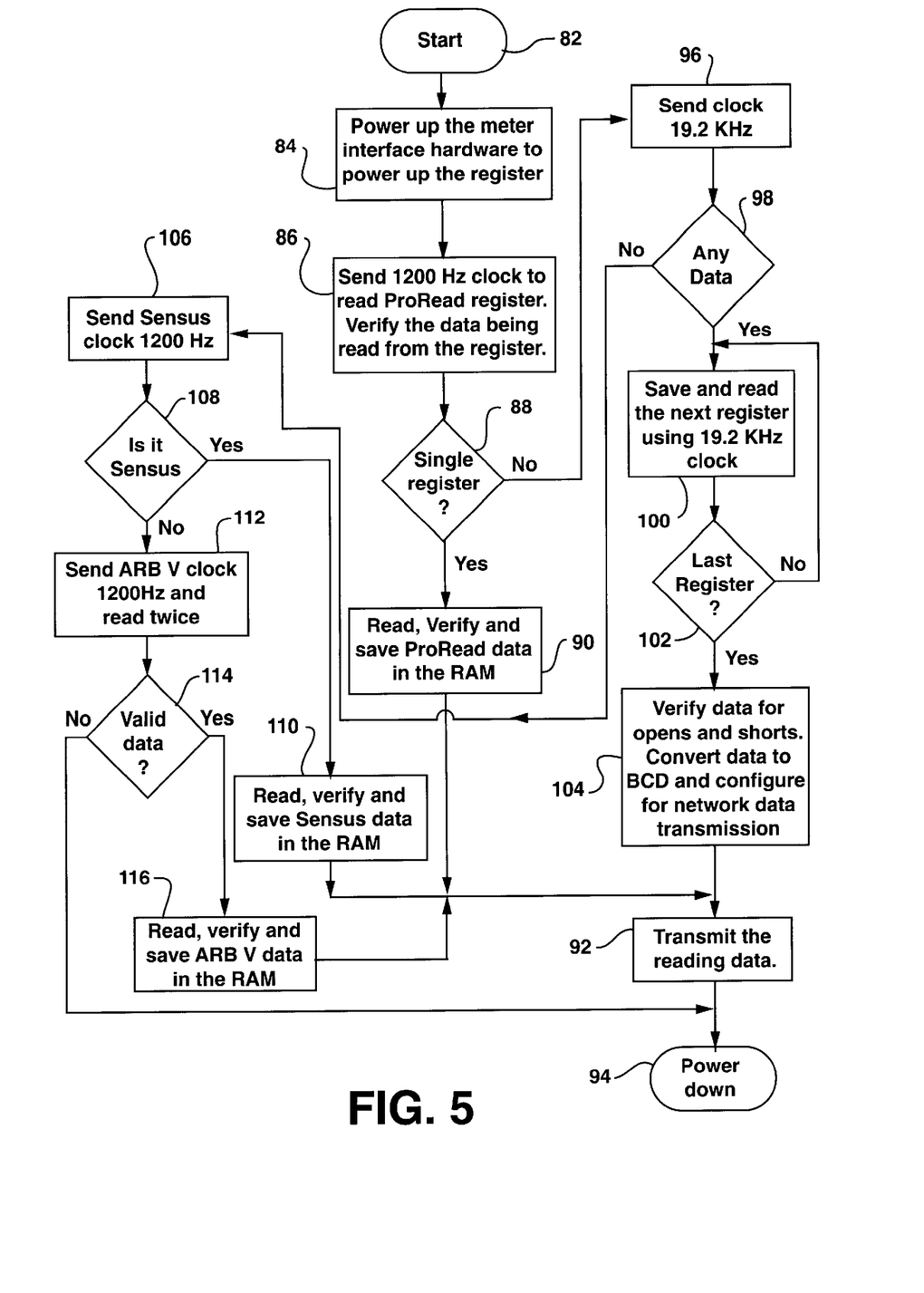
FIG. 5 is a flow chart showing operation of the processor to determine the type of meter encoder and thereafter read usage information therefrom.

As stated above, MIU 10 includes appropriate firmware permitting it to recognize meter encoder 12 from several possible alternatives. FIG. 5 illustrates exemplary method steps that may be implemented by processor 20 to perform this function.

As shown, block 82 represents the start of the program. Once processor 20 is powered up, the program starts executing from the beginning. The program then moves to the next function, indicated by block 84. At this point, initialization and power up configuration tasks are performed. The program initializes the I/O ports, timers and registers of processor 20 to the correct stage. At the end of the initialization, the program starts the main loop to read, verify and transmit the usage information via RF protocol.

At block 86, an ENABLE signal is sent to power management circuitry 26. Processor 20 configures itself to accept data from the encoder register. A predetermined clock of a first frequency, such as 1200 hertz, is begun to cause reading a first type of encoder. For example, a 1200 hertz clock can be initiated to read data from a "ProRead" encoder marketed by Schlumberger RMS. Next, the program moves to decision block 88, where it verifies that the data being received from the meter encoder is of the ProRead type. If the data is of the ProRead type, the program moves to block 90. At block 90, the data is verified for undesirable opens ("-") or shorts ("H"). The term "open" means that there is no electrical contact with one or more of the mechanical wheels in the consumption meter. The term "short" means that two digits are being shorted together to give an invalid reading.

Once the data is verified for opens and shorts, it is saved in RAM 24. Often, this function will convert the data to a BCD format, where it is saved in the RAM buffer. The converted data is then saved in a predefined transmit buffer for transmission. At 92, processor 20 causes the transmit function to transmit the data with the correct ID and account number. After the data has been transmitted, the microprocessor is again powered down, as indicated at 94.

Referring again to block 88, the program moves to block 90 if the data does not identify the first expected type of meter encoder. Processor 20 may then send power of a second predetermined frequency to meter encoder 12. For example, to check for compound registers of the ProRead type, a 19.2 kilohertz signal may be sent. As indicated at decision block 98, the program determines whether any data is being received from meter encoder 12. For example, the program may wait at least 300 milliseconds for ProRead network data. If the data starts coming within 300 milliseconds, then the program may move to block 100.

If the program is at the stage indicated by block 100, it looks for the network number. Usage information from each available register will be pulled and saved until all of the registers are read, as indicated at decision block 102.

After the last register has been read, the program moves to block 104. This function verifies the data for opens and shorts, and adjusts the transmit interval time in ROM 22 to transmit the network data one register data at a time at a shorter interval time with proper ID and account numbers. This function converts the data to a BCD format. A number is loaded in the flag byte which indicates the number of registers' data that needs to be transmitted from the last read. The main module is forced to retrieve the data from ROM 22 for transmission with a shorter interval, which will preferably be the same for each register. At this point, the program proceeds to block 92 for transmission and block 94 for power down as described above.

If no data is sensed at decision block 98, the program moves to block 106. The program will now check to determine whether meter encoder 12 is of another known type. For example, a 1200 hertz clock signal may be sent to meter encoder 12 to determine whether a Sensus meter encoder is present. At decision block 108, the program verifies whether the data received from meter encoder 12 appears to be of the Sensus type. If so, the program moves to block 110. At block 110, the data is converted to a BCD format and placed in the transmit buffer for transmission at block 92.

If the data is not of the Sensus type, the program moves to block 112 where it begins checking for another known type of meter encoder. For example, the program may send a 1200 hertz clock to meter encoder 12 to determine whether a ARB V encoder is present. The data is read twice from the ARB V encoder so that the two readings can be compared (since there is no checksum in this case). At decision block 114, the program determines whether valid data is being received. If data is present in the "DATA" line, then the program moves to block 116. At this point, the program checks for opens and shorts, and converts the data to a BCD format. The converted data is then placed in the transmit buffer for transmission, as indicated at block 92.

If no data is detected at decision block 114, the program moves to block 94 for power down. At this point, MIU 10 waits for the next scheduled read to occur.

It can be seen that the present invention provides a novel meter interface unit in furtherance of the noted objects. While various constructions are described above, one skilled in the art will appreciate that variations and modifications may be made without departing from the invention. In addition, aspects of the various embodiments may also be interchanged both in whole or in part. Furthermore, those of ordinary skill in the art will appreciate that the foregoing description is by way of example only, and is not intended to be limitative of the invention so further described in such appended claims.

What is claimed is:

1. A utility meter interface unit for use with a meter encoder, said unit comprising:
    a transmitter operative to send usage information obtained from said meter encoder to a remote location;
    a processor operative to initiate reading of said usage information from said meter encoder and to control transmission thereof; and power management circuitry responsive to said processor, said power management circuitry operative to direct power from a power source to said meter encoder only at selected times such that power is conserved during periods when said usage information is not being read;

wherein voltage from said power source is modulated by said power management circuitry and supplied to said meter encoder at a predetermined frequency; and wherein said processor is operative to identify said meter encoder and responsively adjust said predetermined frequency.

2. A utility meter interface unit as set forth in claim 1, wherein said processor is operative to read said usage information from both single and compound register encoder systems.

3. A utility meter interface unit for use with a meter encoder, said unit comprising:

a transmitter operative to send usage information obtained from said meter encoder to a remote location;

a processor operative to initiate reading of said usage information from said meter encoder and to control transmission thereof; and power management circuitry responsive to said processor, said power management circuitry operative to direct power from a power source to said meter encoder only at selected times such that power is conserved during periods when said usage information is not being read;

wherein said power management circuitry includes step-up circuitry operative to step-up a source voltage supplied by said power source to a predetermined higher voltage level.

4. A utility meter interface unit as set forth in claim 3, wherein said step-up circuitry includes a storage capacitor for maintaining said predetermined higher voltage level.

5. A utility meter interface unit as set forth in claim 4, wherein said power management circuitry includes a selectively conducting arrangement connected in circuit with said storage capacitor, said selectively conducting arrangement being controlled to switch at said predetermined frequency.

6. A utility meter interface unit as set forth in claim 5, wherein said selectively conducting arrangement includes at least one transistor.

7. A utility meter interface unit as set forth in claim 4, wherein said step-up circuitry includes an inductor connected in circuit with a diode to supply charging current to said storage capacitor.

8. A utility meter interface unit for use with a meter encoder, said unit comprising:

a transmitter operative to send usage information obtained from said meter encoder to a remote location;

a memory;

a processor operative to initiate reading of said usage information from said meter encoder and store data representative thereof in said memory, said processor being operative during reading of said usage information to identify said meter encoder from among at least two encoder models; and said processor being further operative to control transmission of said usage information utilizing a predetermined transmission protocol.

9. A utility meter interface unit as set forth in claim 8, wherein said processor is operative to effect a different clock frequency to be supplied to said meter encoder depending on which of said at least two encoder models is identified.

10. A utility meter interface unit as set forth in claim 9, wherein a first of said at least two encoder models is a single register encoder and a second of said at least two known encoder types is a compound register encoder system.

11. A utility meter interface unit as set forth in claim 9, wherein said predetermined frequency is approximately 1200 Hertz.

12. A utility meter interface unit as set forth in claim 9, wherein said predetermined frequency is approximately 19.2 KHz.

13. A utility meter interface unit as set forth in claim 12, further comprising:

a battery; and power management circuitry responsive to said processor, said power management circuitry operative to direct power from said battery to said meter encoder only at selected times such that battery power is conserved during periods when said usage information is not being read.

14. A utility meter interface unit as set forth in claim 13, wherein voltage from said battery is modulated by said power management circuitry and supplied to said meter encoder at said predetermined frequency.

15. A utility meter interface unit as set forth in claim 14, wherein said power management circuitry includes step-up circuitry operative to step-up a battery voltage supplied by said battery to a predetermined higher voltage level.

16. A utility meter interface unit for use with a meter encoder requiring a predetermined encoder voltage level, said unit comprising:

a power source supplying a source voltage level less than said encoder voltage level;

a transmitter operative to send usage information obtained from said meter encoder to a remote location;

a processor operative to initiate reading of usage information from said meter encoder and to control transmission thereof; and power management circuitry responsive to said processor, said power management circuitry including step-up circuitry operative to step-up said source voltage level to at least said encoder voltage level.

17. A utility meter interface unit as set forth in claim 16, wherein said step-up circuitry includes a storage capacitor for maintaining said predetermined voltage level.

18. A utility meter interface unit as set forth in claim 17, wherein said step-up circuitry includes an inductor connected in circuit with a diode to supply charging current to said storage capacitor.

19. A utility meter interface unit as set forth in claim 16, wherein said power management circuitry includes a selectively conducting arrangement controlled by said processor to supply power to said encoder at a predetermined frequency.

20. A utility meter interface unit as set forth in claim 19, wherein said selectively conducting arrangement includes at least one transistor.

21. A utility meter interface unit as set forth in claim 20, wherein said power source is a battery and said power management circuitry is further operative to direct power from said battery to said meter encoder at selected times such that battery power is conserved during periods when said usage information is not being read.

22. A method of reading usage information from a utility meter encoder, said method comprising steps of:

(a) supplying power to said encoder at a first predetermined frequency;

(b) verifying whether said encoder is of a first known type based on information responsively supplied by said encoder;

(c) if said encoder is not of said first model, supplying power to said encoder at a second predetermined frequency;

(d) verifying whether said encoder is of a second model based on information responsively supplied by said encoder;

(e) reading and storing usage information from said encoder; and (f) transmitting said usage information to a remote location.

23. A method as set forth in claim 22, wherein said first model of encoder is a single register encoder and said second known type of encoder is a multiple register encoder system.

24. A method as set forth in claim 23, wherein said encoder is of said second model and step (e) involves successively reading and storing usage information from each of said multiple registers.

25. A method as set forth in claim 22, wherein said first predetermined frequency is approximately 1200 Hz and said second predetermined frequency is approximately 19.2 KHz.

26. A method as set forth in claim 22, wherein said usage information is converted from a first format supplied by the meter encoder to a second format prior to transmission thereof.

27. A method as in claim 22, wherein clock pulses are supplied to charge a storage capacitor of said meter encoder prior to any data being read.

28. A method as set forth in claim 22, wherein multiple encoders are read using a multiplicity of data lines while using a common clock signal.

29. A method as set forth in claim 22, wherein reading of usage information from said meter encoder is made on a scheduled basis which is programmable.

30. A utility meter interface unit for use with a meter encoder, said unit comprising:

a transmitter operative to send usage information obtained from said meter encoder to a remote location;

a processor operative to initiate reading of said usage information from said meter encoder and to control transmission thereof; and power management circuitry responsive to said processor, said power management circuitry operative to direct power from a power source to said meter encoder only at selected times such that power is conserved during periods when said usage information is not being read and wherein said power management circuitry includes a selectively conducting arrangement controlled by said processor to supply power to said encoder at a predetermined frequency.

31. A utility meter interface unit as set forth in claim 30, wherein said processor is operative to identify said meter encoder and responsively adjust said predetermined frequency.

32. A utility meter interface as set forth in claim 30, wherein said power source comprises a battery.

33. A utility meter interface as set forth in claim 30, wherein said selectively conducting arrangement includes at least one transducer.

34. A utility meter interface unit for use with a meter encoder, said unit comprising:

a transmitter operative to send usage information obtained from said meter encoder to a remote location;

a processor operative to initiate reading of said usage information from said meter encoder and to control transmission thereof;

power management circuitry responsive to said processor, said power management circuitry operative to direct power from a power source to said meter encoder only at selected times such that power is conserved during periods when said usage information is not being read; and wherein said processor is operative to identify said meter encoder and wherein said power management circuitry supplies power at a predetermined frequency depending on the meter encoder identified.

* * * * *